United States Patent [19]

Coiffier et al.

[11] 3,912,499

[45] Oct. 14, 1975

[54] PROCESS FOR OBTAINING METALS FROM ORES OR CONCENTRATES

[75] Inventors: Maurice Coiffier, Paris, France; Andre Montaron, deceased, late of Ozoir-la-Ferriere, France, by Christiane Charles, administrator

[73] Assignee: Compagnie Generale d'Electrolyse du Palais, Paris, France

[22] Filed: Aug. 6, 1973

[21] Appl. No.: 385,657

[30] Foreign Application Priority Data

Aug. 8, 1972 France ............................. 72.28618

[52] U.S. Cl. ............................. 75/3; 75/72; 75/74
[51] Int. Cl.² ..................... C22B 1/24; C22B 15/00
[58] Field of Search ........................... 75/72, 3, 74

[56] References Cited

UNITED STATES PATENTS

| | | | |
|---|---|---|---|
| 2,879,158 | 3/1959 | Nowacki et al. | 75/82 |
| 3,148,974 | 9/1964 | Rampacek | 75/72 |
| 3,300,299 | 1/1967 | Plint | 75/72 |
| 3,473,918 | 10/1969 | Foard | 75/72 X |

FOREIGN PATENTS OR APPLICATIONS 1,946   1879   United Kingdom .................... 75/72

Primary Examiner—Allen B. Curtis

[57] ABSTRACT

A process for treating ores or concentrates containing a metal less oxidizable than iron in at least partially oxidized form, wherein the ore or concentrate is agglomerated with a reducing agent and treated in a shaft furnace in the presence of hot gases, with the composition of the atmosphere prevailing in the bottom of the shaft furnace being controlled by increasing the proportion of oxygen present therein when the iron content of the metal produced becomes excessive.

3 Claims, 1 Drawing Figure

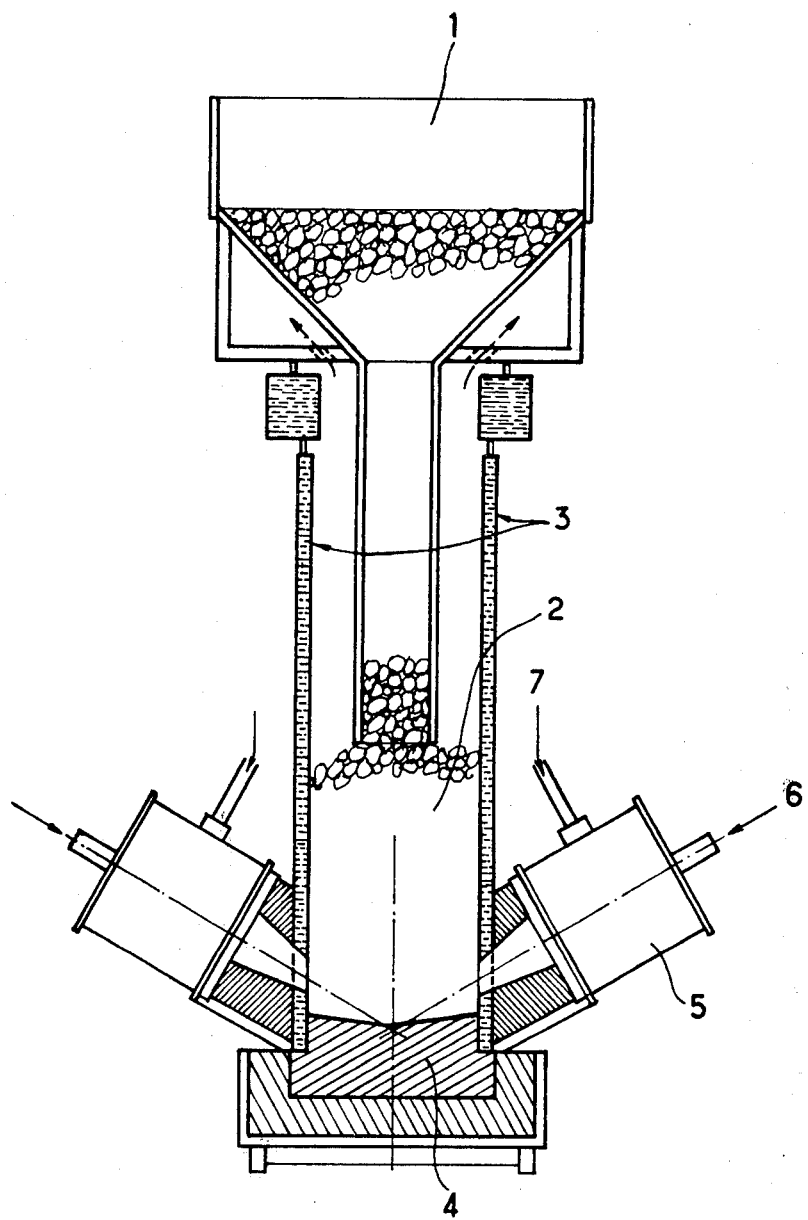

PROCESS FOR OBTAINING METALS FROM ORES OR CONCENTRATES

This invention relates to the treatment of ores or concentrates containing a metal less oxidizable than iron and, in addition, iron at least partly in oxidized form.

The combined heat and chemical treatment of oxidized ores of copper, nickel and other metals less oxidizable than iron is normally carried out in several stages. The first stage comprises reduction at a temperature below the melting point of the metal, and the second stage includes a treatment at a higher temperature during which the liquid metal is obtained. Thus, in the process according to French Pat. No. 1,325,488 for the treatment of nickeliferous ores, production can be carried out using coke dust as the reducing agent, while the subsequent operation is carried out by blowing oxygen, combustion of the iron producing the required increase in temperature.

It has also been proposed (French Pat. No. 2,040,425) to treat nickel ores in the following manner. Agglomerates containing the ore, which consists of nickel oxide, iron oxide and gangue, and a carbonaceous fuel, are prepared in a first stage. These agglomerates are then heated to a temperature of from 1000° to 1200°C, i.e. a temperature below their melting point, which results in reduction of the nickel oxide and, possibly, of part of the iron oxide to the metallic state.

The "calcined" agglomerates, which optionally have non-powdered carbonaceous fuel added to them, are then introduced into a rotary melting furnace heated by burners, and heated to a temperature of from 1450° to 1550°C. This results in the formation of a liquid ferronickel alloy and a similarly liquid scoria which is separated by decantation.

By selecting the quantities of carbonaceous reducing agent added to the ore or "calcined" agglomerates, it is possible to establish more or less reducing conditions.

This process is complicated because it requires two different furnaces, one for "calcining" the agglomerates and the other for melting, the melting furnace being of the rotary type to facilitate rabbling. On the other hand, it is difficult to act on the composition of the metal obtained other than through the carbon content of the agglomerates because a modification to the atmosphere prevailing in the rotary furnace has little or no effect due to the poor contact between this atmosphere and the bath.

In another known process (French Pat. No. 2,020,720), the ore is initially agglomerated with coal, after which the agglomerates are passed downwardly first through a carbonization chamber whose walls have openings through which the volatile materials produced escape, and then through the main chamber of a shaft furnace.

This process obviously has the advantage of simplicity. However, in cases where it is desired to control the compositions of the metal and slag with a degree of precision, it is only possible to act by way of the atmosphere prevailing at the bottom of the furnace within narrow limits beyond which there is a danger of an excessive reduction in temperature.

One disadvantage common to all these processes is that they lack flexibility and are difficult to carry out in such a way as to ensure optimum yield from an economic point of view. This optimum yield has to be obtained with allowance in particular for the fact that there is a relationship between the composition of the metal bath and the composition of the slag, and for the fact that the purity of the metal can be improved by accepting higher losses in the slag.

In French Pats. Nos. 353,029 and 586,539, it has been proposed to act on the composition of the metal obtained by introducing iron or iron ore into the melting bed, but unfortunately these additions in no way lessened the lack of flexibility which is a criticism of conventional processes.

There are three separate operations which take place successively during reduction, namely, reduction of all the oxide of the metal selected and of a little oxide of undesirable, more oxidizable metals (for example, iron), the generalization of heat to melt the reduced metal and the adjustment of the contents of the metal bath and of the scoria to the required levels through reoxidation of the undesirable metal.

It is clear that it is not easy to obtain a high degree of flexibility of these three operations interfere with one another or are governed by the same parameters.

Conventional processes use carbon introduced into the charge as reducing agent for the first operation and as fuel for the second. On the other hand, an oxygen-containing gas is generally introduced at the bottom of the furnace, participating in the second operation as a supporter of combustion, and in the third operation as oxidizing agent. The quantities of carbon and oxygen introduced are essentially determined by the temperature to be reached, and the conditions are necessarily of a highly reducing nature in the first operation and of a highly oxidizing nature in the last operation, which explains the difficulties encountered in keeping the composition of the metal and of the slag within the limits selected.

It is accordingly an object of the present invention to provide a process for obtaining metals from oxidized ores or concentrates which overcomes the foregoing disadvantages, and it is a more specific object of the present invention to provide a process for obtaining metals from oxidized ores which can be carried out in a simple and efficient manner with a high degree of flexibility.

Other objects and advantages of this invention will appear more fully hereinafter and, for purposes of illustration but not of limitation, an embodiment of the invention is shown in the accompanying drawing in which the drawing illustrates a shaft furnace for use in the practice of this invention.

The process according to the invention uses different means for each of the operations. For the first reducing operation, it makes use of the observation that, in an agglomerate containing both carbon and metal oxides, the metal oxides are reduced by the carbon irrespective of the type of atmosphere surrounding the agglomerates. For the second operation, it makes use of such apparatus as combustion chambers which produce gases of high temperature approaching neutrality in their composition outside the zone in which the ore is situated. For the third operation, it uses a controllable injection of oxygen-containing gas.

A process of this kind has a much higher degree of flexibility than conventional processes by virtue of the fact that the quantity of carbon introduced with the ore can be fixed on the sole basis of the composition of this ore, and corresponds to the quantity required for reducing the required metal oxide with only a slight excess to ensure that reduction is complete at all points. Feeding of the combustion chambers is regulated to obtain the most favorable utilization of energy irrespective of the composition of the atmosphere prevailing in the furnace, and the quantities of oxygen subsequently introduced are calculated solely on the basis of the quantity and purity of the metal it is required to obtain.

The process according to the invention comprises the following stages:

preparing agglomerates containing, in intimate admixture, the ore or concentrate and a quantity of carbon sufficient for reducing all the required metal and part of the iron into the metallic state;

treatment in a shaft furnace in the presence of hot gases produced outside the furnace whose composition is adjusted on the principle that, if the metal produced shows an excessive iron content, the proportion of oxygen is increased, and that the proportion of oxygen is reduced if the slag contains too much of the required metal, and separating the liquid metal and liquid slag.

A binder whose composition is derived from that of the slag by subtracting the gangues present in the ore or concentrate, is preferably used for preparing the agglomerates.

A small quantity of gasifiable substances may optionally be added to the charge of the furnace in large portions so as to produce in the mass voids which promote circulation of the gases. Non-powdered carbonaceous fuel can be employed for this purpose, being used in a small proportion in relation to the total charge.

The hot gases are advantageously produced in combustion chambers equipped with burners and arranged outside the furnace, the oxygen content being adjusted by means of nozzles injecting compressed air or oxygen which open either into the combustion chamber or into the duct connecting it to the shaft of the furnace or directly into the furnace.

The agglomerates are heated in the upper part of the furnace and, when the temperature is sufficient (around 800°C or higher or lower depending upon the metals), the reaction between the carbon and the oxides commences. All the metal and some of the iron are reduced to the metallic state irrespective of the atmosphere prevailing in this part of the furnace. This is because, in each agglomerate, reaction of the carbon with the oxides produces an evolution of gaseous CO and $CO_2$ which, directed towards the outside, isolates the interior from the surrounding atmosphere.

In the lowest zones where the temperature is higher, melting begins and is accompanied in particular by the formation of droplets of molten metal charged with iron. Depending upon the type of atmosphere prevailing in this zone, the iron then undergoes selective oxidation by which it is restored to the oxide state in a more or less large quantity. In view of the limited size of these droplets, the chemical equilibrium is reached before the droplets fall to the bottom of the furnace. In this way, it is possible to very easily regulate the operation either to give a highly pure metal or a minimal loss in the slag or an intermediate result corresponding to an economic optimum.

One particularly favorable application of the invention is where the reduced ore is a concentrate obtained by the segregation process. This is because concentrates of this kind normally consist of a core containing the carbon and iron oxide and of a peripheral layer of the required metal oxidized to a greater or lesser extent. Preparation of the agglomerates merely involves agglomerating these concentrates, which are in the form of extremely fine particles (60 microns), with a binder.

In the case of so-called "TORCO" cupriferous concentrates, whose composition is as follows:

55 to 80% of copper, some of which is sometimes oxidized, the rest being metallic,
2 to 15% of carbon,
2 to 20% of iron oxide, above all $Fe_3O_4$,
balance: various gangues, the process can be carried out as follows:

1. Agglomerating the concentrates with a binder whose composition and quantity are calculated in such a way that melting of the agglomerates produces from 10 to 60 kg of slag for 100 kg of copper, this slag containing: 15 to 45% of $SiO_2$, 10 to 35% of $CaO + MgO$, 0 to 30% of $Al_2O_3$ and 20 to 60% of FeO;
2. Treating the agglomerates in a vertical furnace at a temperature above the melting point of copper in the presence of hot gases whose rate of flow and composition are calculated in such a way that, following combustion of the carbon in the charge, the excess oxygen leaves 0.2 to 2% of the copper in oxidized form, and a quantity of iron amounting to between 1 and 5% of the weight of the copper in metallic form.
3. Separating the liquid metal and liquid scoria.

The limits to the quantity and quality of the slag correspond on the one hand to the fact that the slag should be sufficiently fusible to allow suitable separation by decantation and, on the other hand, to the need to have the smallest possible quantity of slag.

Calculation shows that, at equilibrium, the Cu and Fe contents of the metal: $(Cu)_m$ and $(Fe)_m$, and of the slag: $(Cu)_s$ and $(Fe)_s$, are all connected by the following relation for a temperature T:

$$\frac{(Cu)_s \cdot (Fe)_m}{(Cu)_m^2 \cdot (Fe)_s} = K(T)$$

Where K is a constant governed solely by T, $(Cu)_m$ is approximately 1, $$(Fe)_s = \frac{Fe/Cu}{L}$$

where Fe/Cu is the ratio of the contents in the concentrate and L the quantity of slag based on the weight of copper produced.

The loss of copper in the slag PCu, based on the metal produced, is equal to $(Cu)_s \cdot L$.

It follows from this that
 PCu · $(Fe)_m$ = K Fe/Cu

Experience has in fact shown that, for a concentrate with an Fe/Cu value of 0.17, the values are as follows:

| $(Fe)_m$ % | $(Cu)_s$ % | PCu % |
|---|---|---|
| 5 | 0.5 | 0.16 |
| 3.5 | 0.7 | 0.23 |
| 3 | 0.8 | 0.27 |
| 1 | 2.5 | 0.8 |
| 0.5 | 5 | 1.6 |

Accordingly, for any given concentrate, there is a range of conditions for operating the furnace under which it is possible to obtain the desired results. Conditions of an excessively oxidizing or excessively reducing nature result in departure from the favorable zone either through an exaggerated loss of copper or through an excessive concentration of iron in the metal.

The extent of the range and the value of the product $(Fe)_m \cdot PCu$ are governed by the coefficient K which varies as a function of the temperature. It is of advantage to maintain the lowest possible temperature, although the viscosity of the slag does impose a limit in this respect because it has to be low enough to insure effective separation of the metal issuing from the furnace.

In practice, slags with the compositions specified earlier enable favorable results to be obtained with the usual "TORCO" concentrates.

For example, a "TORCO" concentrate with the following percentage composition was subjected to treatment:

| Cu | Fe | C | O | As | Mn | SiO₂ | CaO |
|---|---|---|---|---|---|---|---|
| 69.8 | 12 | 4 | 6.5 | 1 | 0.2 | 4.5 | 0.5 |
| Al₂O₃ | | MgO | | S | | Cl | |
| 0.8 | | 0.1 | | 0.5 | | 0.1 | |

These concentrates were agglomerated by the addition of bentonite containing 60% of $SiO_2$ and 18% of $Al_2O_3$, and hydraulic lime containing 23% of $SiO_2$ and 60% of CaO, in quantities of 2.5 kg and 5 kg, respectively, per 100 kg of concentrate.

The agglomerates, 10 to 25 mm in diameter, were dried and then introduced at the top of a vertical furnace.

This furnace illustrated in the drawing comprises a charging hopper 1, a rectangular shaft 2 which is 3.75 m tall and 5 × 1 m in section and whose walls are formed by water-circulation tanks 3; a hearth 4 which is supported by jacks and on which the tanks rest when the furnace is in operation (the hearth has a chrome-magnesia lining); then fuel-burning combustion chambers 5 opening into the furnace which, in addition to the burner 6, are provided with a lateral inlet for additional air 7.

The copper and the slag are collected together in a covered heat-insulated forehearth where they decant.

The slag is collected by continuously running off from an overflow, the metal is removed by running off every few hours.

The furnace is fed with agglomerate at a rate of 8 t/hour with 70–80 mm. lumps of coke added at a rate of 0.4 t/hour.

The combustion chambers each burn 50 kg of fuel per hour and each receive 800 m³/hour of air which corresponds to an excess of air of 60%.

The metal run off essentially contains 96% of copper, 3% of iron and 1% of arsenic. It has the characteristics of a blister copper and is fed into an anode melting furnace.

The slag, which is produced at a rate of 40 kg per 100 kg of metal, has the following composition: FeO 53.5 %, $SiO_2$ 27.5%, CaO 13.5%, $Al_2O_3$ 5%, MgO 0.5%, Cu 0.7%.

It will be apparent that various changes and modifications can be made in the details of procedure, formulation and use without departing from the spirit of the invention, especially as defined in the following claims.

We claim:

1. A method for the treatment of ores or concentrates containing iron and a metal less oxidizable than iron, with the metals being in at least partially oxidized form, comprising the steps of forming agglomerates of the ore or concentrate with a reducing agent, with the reducing agent being present in an amount sufficient to reduce all said metal and a portion of the iron to the metallic state, introducing the agglomerates to the upper portion of a shaft furnace while heating and introducing an oxygen-containing gas to the lower portion, with the temperature in the upper portion of the furnace being sufficient to commence reaction between said reducing agent and said metal to reduce the less oxidizable metal and a portion of the iron, maintaining the temperature in the lower portion of the furnace higher than that in said upper portion of the furnace, causing the agglomerates to descend in the furnace to initiate melting and formation of molten droplets of the less oxidizable metal charged with iron, reacting the iron with the oxygen-containing gas introduced at the lower portion of the furnace to selectively oxidize the iron and form iron oxides without reoxidizing said metal before the droplets reach the bottom of the furnace, and separating said metal in molten form.

2. A process as defined in claim 1 wherein the reducing agent is carbon.

3. A process as defined in claim 1 wherein the concentrate is a copper concentrate and the copper concentrate is agglomerated with a binder in an amount sufficient to provide a melted agglomerate containing 10 to 60 kg of slag per 100 kg of copper, the slag containing 15 to 45% by weight of $SiO_2$, 10 to 35% by weight of CaO + MgO, 0 to 30% by weight of $Al_2O_3$ and 20 to 60% by weight of FeO, and the agglomerates are treated in a shaft furnace at a temperature above the melting point of copper in the presence of hot gases in an amount sufficient that, following combustion of the reducing agent, the excess oxygen leaves 0.2 to 2.0% by weight of copper in oxidized form and iron in an amount within the range of 1 to 10% by weight of the copper in metallic form.

* * * * *